United States Patent Office 2,862,036
Patented Nov. 25, 1958

2,862,036
PREPARATION OF 2,2,3-TRICHLOROHEPTAFLUOROBUTANE

Charles F. Baranauckas and William E. Ashton, Niagara Falls, N. Y., assignors to Hooker Chemical Corporation, Niagara Falls, N. Y., a corporation of New York No Drawing. Application August 13, 1956
Serial No. 603,826

8 Claims. (Cl. 260—653.7)

This invention relates to the preparation of a perhalobutane, and more particularly relates to the preparation of 2,2,3-trichloroheptafluorobutane by treating a straight chain perhalocarbon containing four carbon atoms with a fluorinating agent.

The compound 2,2,3-trichloroheptafluorobutane prepared by the process of this invention is useful as a solvent in a variety of reactions. Further, the compound is useful as a heat transfer agent due to its chemical inertness, its boiling point and other physical properties.

In United States Patent 2,436,357 Gochenour et al. described the fluorination of hexachlorobutadiene in such manner as to eliminate one of the double bonds, and cause the shift of the other double bond to the $C_2$—$C_3$ carbon atoms while substituting fluorine atoms for some of the chlorine atoms present in the original molecule, thereby to form dichlorohexafluorobutene-2, and monochloroheptafluorobutene-2. The fluorinating agent employed according to Gochenour et al. is a composition containing an antimony halide, hydrogen fluoride, and elemental chlorine.

We have now found that when starting with a perhalocarbon represented by the formula CXCX′CX′CX in which X consists of two or three atoms of fluorine, chlorine or a mixture thereof and X′ consists of one or two atoms of chlorine, in admixture with a fluorinating agent containing an antimony halide, hydrogen fluoride, and elemental chlorine and while maintaining the temperature of the reaction zone between about 200 degrees and about 300 degrees centigrade for a contact time of less than ten hours, 2,2,3-trichloroheptafluorobutane may be prepared in good yield.

The reactions illustrated in the following equations show the preparation of the desired compound 2,2,3-trichloroheptafluorobutane by reacting a straight chain perhalocarbon containing four carbon atoms, for example a butadiene, such as hexachlorobutadiene; a butene, such as 2,3-dichlorohexafluorobutene-2 and a butane, such as 2,2,3,3-tetrachlorohexabutane with a fluorinating agent containing an antimony halide, hydrogen fluoride and elemental chlorine.

(1)

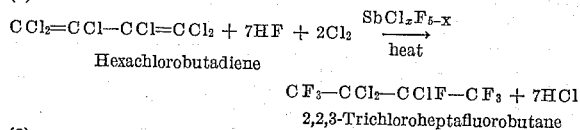

(2)

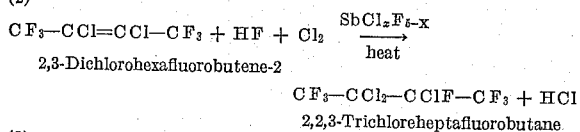

(3)

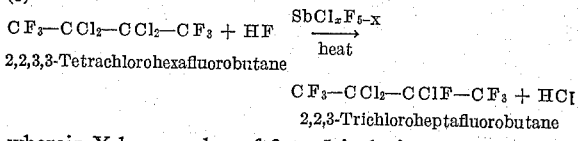

wherein X has a value of 0 to 5 inclusive.

Other starting materials including 1,2,3-trichloropentafluorobutene-2; 1,1,2,3-tetrachlorotetrafluorobutene-2; 1,1,1,2,3-pentachlorotrifluorobutene-2; 1,1,2,3,4,4-hexachlorodifluorobutene-2 and 1,1,1,2,3,4,4,4-octachlorobutene-2 which forms 2,3-dichlorohexafluorobutene-2 in situ under the conditions of the process of this invention, may be used.

The following examples illustrate various ways of practising our invention, but it is to be understood that the specific details given in the examples have been chosen for the purpose of illustration and are not intended to limit our invention, except as defined in the appended claims. In the examples, all parts are expressed by weight except where otherwise defined.

EXAMPLE 1

A Monel-clad autoclave that had been pre-cooled to about minus 50 degrees centigrade in the absence of moisture was charged with 1,398 parts of 2,3-dichlorohexafluorobutene-2, 1,074 parts of antimony trifluoride, and 852 parts of chlorine and was sealed. The autoclave was then inserted into a rocking type heating jacket and the temperature was recorded automatically from a thermocouple inserted in the thermowell of the autoclave.

The reactor was heated rapidly to a temperature of about 250 degrees centigrade, and maintained at this temperature for seven hours and attained a pressure of approximately 1200 p. s. i. g. Thereafter the reactor was cooled rapidly to below zero and the contents vented into a collection system consisting of a series of caustic traps to neutralize the acidic components then into a Dry-Ice trap to collect any low boiling products. After the initial venting had subsided, the reactor was heated to 150 degrees centigrade to distill over the higher boiling products to the collection system. The antimony salts remaining in the reactor were cooled to room temperature and were decomposed by the addition of 1,000 milliliters of hydrochloric acid. The decomposed salt slurry was extracted with carbon tetrachloride to insure complete recovery of the organic products. The crude product was washed, dried and fractionated. The desired product, 2,2,3-trichloroheptafluorobutane (82.7% yield), was collected over a temperature range of 96 degrees to 98 degrees centigrade and then was treated with moist soda ash to remove any acidic materials to provide a clear water-like liquid having a refractive index of 1.3525± 0.0002 at 20 degrees centigrade.

EXAMPLE 2

In an apparatus similar to that described in connection with Example 1, 1,398 parts of 2,3-dichlorohexafluorobutene-2, 1,800 parts of antimony pentachloride, 300 parts of chlorine and 600 parts of hydrogen fluoride were charged into the Monel clad autoclave.

The reactor contents were heated rapidly to a temperature of 250 degrees centigrade and maintained at this temperature for seven hours. The product, 868 parts of 2,2,3-trichloroheptafluorobutane (80.5% yield) was obtained in a manner after that described in Example 1.

EXAMPLE 3

In an apparatus and under conditions similar to that described in connection with Example 1, 261 parts of hexachlorobutadiene, 1200 parts of antimony pentachloride, 600 parts of hydrogen fluoride and 200 parts of chlorine were charged into the autoclave.

The reactor contents were heated rapidly to a temperature of 250 degrees centigrade and maintained at this temperature for four hours. The product, 133 parts of 2,2,3-trichloroheptafluorobutane (46.2% yield) was obtained in a manner after that described in Example 1.

EXAMPLE 4

In an apparatus, and under conditions similar to that described in connection with Example 1, 517 parts of 2,2,3,3-tetrachlorohexafluorobutane, 600 parts of antimony pentachloride and 600 parts of hydrogen fluoride were charged into the autoclave.

The reactor contents were heated rapidly to a temperature of 250 degrees centigrade for five hours. The product, 180 parts of 2,2,3-trichloroheptafluorobutane (37% yield) was obtained in a manner after that described in Example 1.

EXAMPLE 5

Octachlorobutene-2 (0.99 moles, 329 grams) and antimony trifluoride (3 moles, 536 grams) were placed in a Monel autoclave with a capacity of three liters. The autoclave and contents were gradually heated with agitation over a 25 hour period to approximately 200 degrees centigrade and maintained at this temperature for an additional five hours. The bomb and contents were cooled to 50 degrees centigrade and the pressure within the autoclave was released by venting it into a receiver cooled in a bath of Dry Ice and ethanol. After cooling the bomb and contents to below 20 degrees centigrade, the material remaining in the bomb was washed four times with 6 N hydrochloric acid, once with water, once with dilute aqueous sodium carbonate, and combined with the material collected in the receiver. After drying, this material was rectified. 2,3-dichlorohexafluorobutene-2 was obtained in 57 percent yield.

The following table contains the results of examples of the process of this invention wherein reaction conditions were varied.

although periods of from less than eight hours are preferred.

Agitation is desirable in the process of this invention especially since the reactants are not mutually soluble in one another. The reaction slows down appreciably without agitation of the liquid. Agitation may be accomplished by mechanical means such as by mechanical stirrers and pulsating or rocking autoclaves. The fluorinating agent contains an antimony halide and hydrogen fluoride and/or elemental chlorine depending upon the starting material as shown in the above equations.

The preferred antimony halides are the antimony chlorofluorides such as antimony dichlorotrifluoride. These halides may be prepared by reacting antimony pentachloride with hydrogen fluoride at temperatures about 150 degrees centigrade or by reacting antimony fluorides with chlorine at about 100 degrees centigrade. The process of this invention may be conducted batch-wise or continuously. The reaction is preferably conducted under the vapor pressure of the reactants at the temperature employed which keeps the reactants substantially in the liquid phase and increases the mutual solubility thereof. While we have indicated that antimony dichlorotrifluoride is the preferred antimony halide, it will be apparent to those skilled in the art that the precise composition of the antimony halide may vary during the course of the reaction.

It is to be understood that the above described examples are simply illustrative of the application of the principles of the invention. Numerous other modifications may be readily devised by those skilled in the art which will embody the principles of the invention and fall within the spirit and scope thereof.

*Table*

| Example No. | $C_4Cl_2F_6$, pts. | $SbCl_5$, pts. | $SbF_3$, pts. | HF, pts. | Cl, pts. | Temp., °C. | Press., p.s.i.g. | Reaction time, hrs. | $C_4Cl_3F_7$, pts. | Residual, pts. | Yield $C_4Cl_3F_7$, percent |
|---|---|---|---|---|---|---|---|---|---|---|---|
| 6 | 466 | 600 | | 600 | 170 | 300 | | 5 | 168 | 73 | 33.2 |
| 7 | 466 | 600 | | 600 | 170 | 275 | | 5 | 254 | 81.2 | 50.8 |
| 8 | 466 | 600 | | 600 | 170 | 250 | 2,950 | 5 | 375 | 54 | 71.7 |
| 9 | 466 | | 358 | | 304 | 250 | 1,200 | 5 | 406 | 63.5 | 78.7 |
| 10 | 466 | 600 | | 600 | 192 | 225 | 2,180 | 5 | 289 | 118 | 62.5 |
| 11 | 466 | 600 | | 600 | 210 | 200 | | 5 | 11 | 236 | |
| 12 | 1,398 | | 1,074 | | 852 | 250 | 700 | 7 | 875 | 493 | 70.3 |

It is critical that the temperature range in the process of this invention be between about 200 degrees and about 300 degrees centigrade, although the preferred temperature range is between about 225 degrees and about 275 degrees centigrade. At temperatures above 275 degrees centigrade, the amount of 2,3-dichlorooctafluorobutane produced becomes appreciable and results in a decreased yield of the desired product. At temperatures below about 225 degrees centigrade, the yield of product drops off sharply and most of the starting material is recovered as 2,2,3,3-tetrachlorohexafluorobutane, which may be recycled to produce the desired product.

The contact time of the starting material with the fluorinating agent may be varied to some extent without noticable sacrifice of advantageous high efficiency of operation. However, if contact time is excessive, the capacity of the reactor is low thereby causing economic disadvantages in the operation. On the other hand, if contact time is too short, the reaction of starting material to form desired product may be incomplete thereby entailing high cost of recovering and recycling unreacted material to subsequent operation. Accordingly, the time of contact is determined by balancing the economic advantage of high reactor throughput obtained at short contact times against the cost of recovery of unreacted starting material. It has been found that to obtain optimum conditions, passage of the starting material in contact with the fluorinating agent should be controlled to effect a residence or contact time of less than ten hours

We claim:

1. A process for making 2,2,3-trichloroheptafluorobutane which includes: heating a perhalocarbon selected from the group consisting of hexachlorobutadiene; 2,3-dichlorohexafluorobutene-2; 1,2,3-trichloropentafluorobutene-2; 1,1,2,3-tetrachlorotetrafluorobutene-2; 1,1,1,2,3-pentachlorotrifluorobutene-2; 1,1,2,3,4,4-hexachlorodifluorobutene-2 and 1,1,1,2,3,4,4,4-octachlorobutene-2, with a fluorinating agent containing an antimony halide, hydrogen fluoride and elemental chlorine while maintaining the reaction temperature between about 200 degrees and 300 degrees centigrade for a contact time of less than ten hours.

2. The process according to claim 1 wherein said perhalocarbon is a perhalobutadiene.

3. The process according to claim 1 wherein said perhalocarbon is a perhalobutene.

4. The process according to claim 1 wherein said antimony halide is an antimony chlorofluoride.

5. A process for making 2,2,3-trichloroheptafluorobutane which includes: heating a perhalocarbon selected from the group consisting of hexachlorobutadiene; 2,3-dichlorohexafluorobutene-2; 1,2,3 - trichloropentafluorobutene-2; 1,1,2,3-tetrachlorotetrafluorobutene-2; 1,1,1,2,3-pentachlorotrifluorobutene-2; 1,1,2,3,4,4-hexachlorodifluorobutene-2 and 1,1,1,2,3,4,4 - octachlorobutene - 2 with a fluorinating agent containing an antimony halide, hydrogen fluoride and elemental chlorine while maintaining the reaction temperature between about 225 degrees and 275 degrees centigrade for a contact time of less than ten hours.

6. A process for making 2,2,3-trichloroheptafluorobutane which includes: heating a perhalocarbon represented by the formula $CF_3-CCl=CCl-CF_3$ with a fluorinating agent containing an antimony halide, hydrogen fluoride and elemental chlorine while maintaining the reaction temperature between about 225 degrees and 275 degrees centigrade for a contact time of less than ten hours.

7. A process for making 2,2,3-trichloroheptafluorobutane which includes: heating hexachlorobutadiene with a fluorinating agent containing an antimony halide, seven moles of hydrogen fluoride and two moles of chlorine per mole of starting material while maintaining the reaction temperature between about 225 degrees and 275 degrees centigrade for a contact time of less than ten hours.

8. A process for making 2,2,3-trichloroheptafluorobutane which includes: heating a perhalocarbon selected from the group consisting of hexachlorobutadiene; 2,3-dichlorohexafluorobutene-2; 1,2,3-trichloropentafluorobutene-2; 1,1,2,3-tetrachlorotetrafluorobutene-2; 1,1,1,2,3-pentachlorotrifluorobutene-2; 1,1,2,3,4,4 - hexachlorodifluorobutene-2 and 1,1,1,2,3,4,4,4 - octachlorobutene - 2 with a fluorinating agent containing an antimony dichlorotrifluoride, hydrogen fluoride and elemental chlorine while maintaining the reaction temperature between about 225 degrees and 275 degrees centigrade for a contact time of less than ten hours.

References Cited in the file of this patent

UNITED STATES PATENTS

| | | |
|---|---|---|
| 2,062,743 | Daudt et al. | Dec. 1, 1936 |
| 2,436,357 | Gochenour et al. | Feb. 17, 1948 |

FOREIGN PATENTS

| | | |
|---|---|---|
| 740,418 | Great Britain | Nov. 9, 1955 |